United States Patent [19]

Renholts

[11] Patent Number: 4,598,003
[45] Date of Patent: Jul. 1, 1986

[54] IMPRINTABLE TAPE AND METHOD FOR IMPRINTING SAME

[76] Inventor: Roy J. Renholts, 984 Customs Rd., Pebble Beach, Calif. 93953

[21] Appl. No.: 719,741

[22] Filed: Apr. 4, 1985

Related U.S. Application Data

[63] Continuation-in-part of Ser. No. 489,528, Apr. 28, 1983, abandoned.

[51] Int. Cl.⁴ .................. B32B 7/06; B32B 27/06
[52] U.S. Cl. ...................... 428/40; 156/230;
428/41; 428/195; 428/201; 428/202; 428/204;
428/332; 428/422
[58] Field of Search .............. 428/195, 332, 212, 405,
428/201, 204, 202, 422, 41; 420/337; 156/222,
85, 220, 234, 230

[56] References Cited

U.S. PATENT DOCUMENTS

| | | | |
|---|---|---|---|
| 3,309,257 | 3/1967 | Borack | 428/212 X |
| 4,092,198 | 5/1978 | Scher et al. | 156/222 |
| 4,377,050 | 3/1983 | Renholts | 428/40 |

Primary Examiner—Thomas J. Herbert
Attorney, Agent, or Firm—Robert Charles Hill

[57] ABSTRACT

Various embodiments of an imprintable tape and a preferred method for forming and imprinting the tape are disclosed. Generally, the tape includes an opaque film portion formed from polytetrafluoroethylene and a layer of material of contrasting color laminated to the opaque film so that upon application of compressive force to a selected surface portion of the film, unique characteristics of the polytetrafluoroethylene in the opaque film cause it to become transparent within the selected surface portion and thereby form a contrasting indicia or design by the resulting exposure of the underlying tape or surface. Another embodiment of the tape employs an underlying surface to which the tape is applied for forming the contrasting indicia or design exposed by compressing part of the tape. Various embodiments are disclosed for forming a contrasting colored surface beneath the opaque film. In addition, the embodiments also include an adhesive layer covered by a removable or peelable backing for securing the tape to a surface. The various embodiments also preferably comprise a protective film overlying the opaque polytetrafluoroethylene film.

21 Claims, 5 Drawing Figures

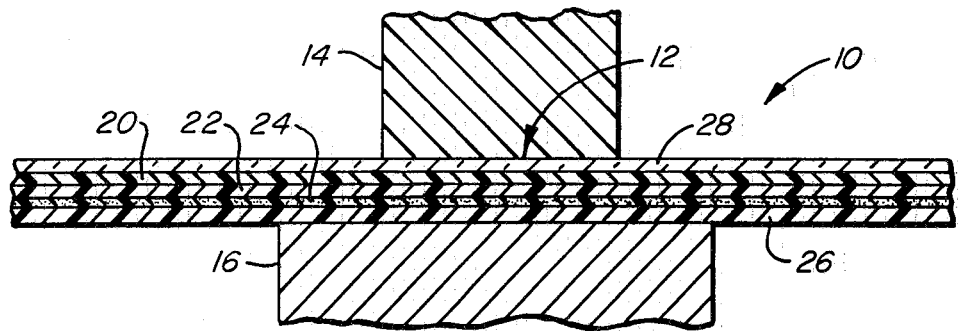
FIG._1.
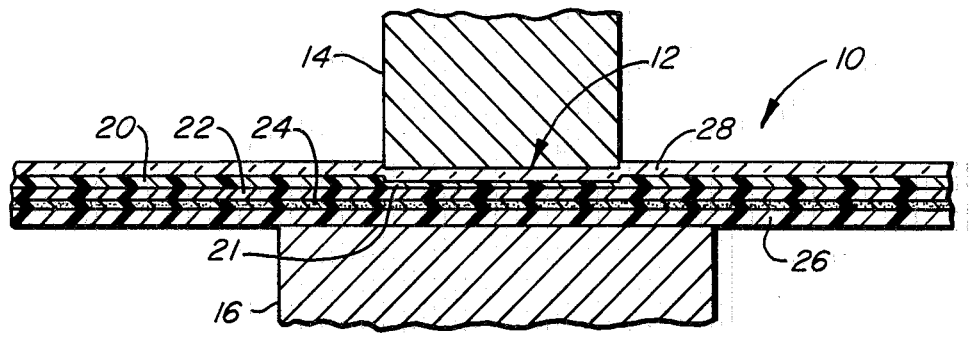
FIG._2.
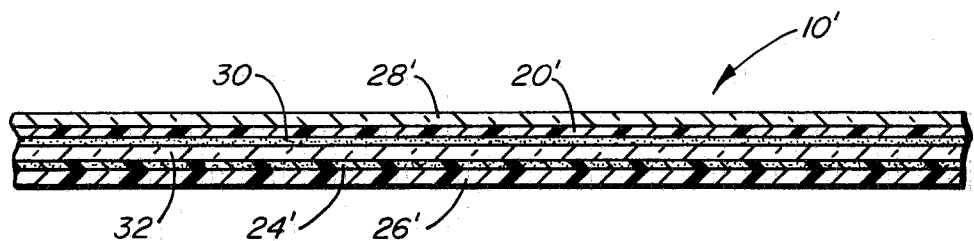
FIG._3.

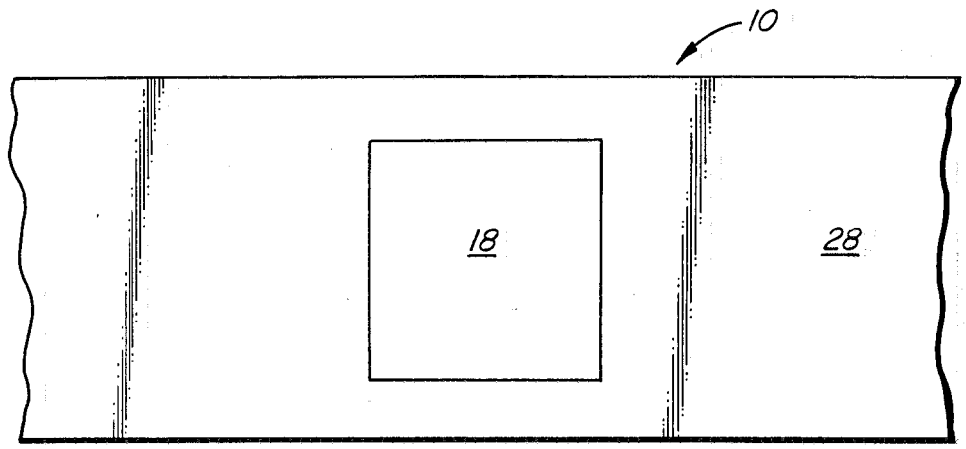
FIG._4.
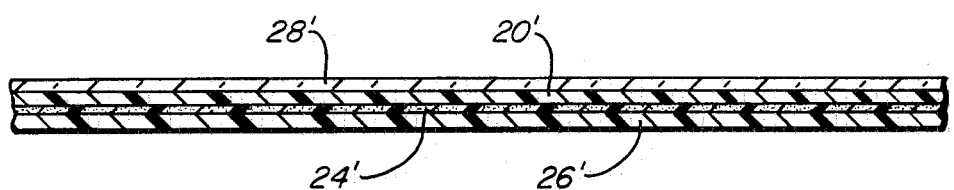
FIG._5.

IMPRINTABLE TAPE AND METHOD FOR IMPRINTING SAME

This is a continuation-in-part of parent U.S. patent application Ser. No. 489,528 filed Apr. 28, 1983 and now abandoned.

BACKGROUND OF THE INVENTION

The present invention relates to a laminated tape adapted for imprinting of selected indicia thereupon and a method for forming and imprinting the laminated tape.

In the prior art, a number of different techniques have been described for forming various selected indicia or designs upon a film or tape. Within this prior art, indicia have, for example, been applied to tape by creasing or producing tensile stress within the tape in a pattern of narrow linear elements. Stressing the tape in this manner causes the linear features of the pattern to assume a white or lightened color relative to the normal tape color. Thus, this technique and apparatus have commonly been employed for producing labels and the like by applying numbers, letters and other designs to the tape.

Although widely popular, this prior art technique has demonstrated certain limiting characteristics. For example, because of the need for applying substantial pressure in order to produce tensile stress sufficient to result in a color change of the tape, its use is generally limited to formation of designs such as letters, numbers or the like which are formed by generally thin linear elements. The need for developing substantial tensile stress within the tape in order to proudce the desired color change makes it difficult to form designs having portions of substantial width or dimension. At the same time, tape adapted for use with the technique described above is formed from a pigmented plastic or a clear plastic joined to a colored adhesive, which plastic is lightened or changed to a white color by the application of stress. Thus, this technique is generally limited to production of a tape having a single background color with the imprinted designs in the form of letters, numbers or the like being either white or a lighter variation of the same background color.

Various other techniques have also been made available in the prior art for imprinting laminated tape or the like. For example, Cutler et al U.S. Pat. No. 3,575,755 issued Apr. 20, 1971 relates to a laminated tape including a layer of heat-shrinkable material. A selected design was applied to the tape by heating selected portions of the tape thereby causing the heat-shrinkable material to pull away and expose a separate layer of an underlying material having a contrasting color or the like, thus forming a selected design or indicia. However, with this technique, its laminated tape was relatively complex at least in part because of the requirement for the material to be heat-shrinkable. In addition, the final design depended upon the amount of shrinkage for different parts of the design so that resolution of the finished design tended to vary depending upon the tape and application of the selected design.

Kanzelberger U.S. Pat. No. 4,047,996 issued Sept. 13, 1977 related to yet another method and apparatus for imprinting plastic plates wherein pigment was transferred from a carrying film in a technique commonly referred to as a hot stamp process. Thus, the method and apparatus of this reference were more commonly classified under the term "applique" differing substantially from the tape and method of the present invention.

Perrington et al U.S. Pat. No. 4,123,309 issued Oct. 31, 1978 related to a transfer letter system wherein pigment was transferred from a carrier film by selectively softening portions of a design with radiation and allowing those portions to adhere to another strip or tape of contrasting color. Here again, it may be seen that the technique of this reference also fell within the classification of an applique.

Scher et al U.S. Pat. No. 4,092,198 issued May 30, 1978 related to a process for embossing and laminating wherein substantial pressures and temperatures were applied over long periods of time to a thermosetting plastic in order to produce a contrasting pattern having gradual color transitions. The process was relatively complex involving application of excessive pressures in the range of 800 to 1200 psi, for example, and excessive temperatures in the range of 260°–310° F. These conditions were necessary since the invention further contemplating formation of the design in a coating formed from a thermosetting plastic such as a melamine resin, the excessive pressures and temperatures being necessary to produce limited lateral movement resulting in a pattern formed by generally gradual color transitions.

Hodgdon et al U.S. Pat. No. 2,240,072 dated Apr. 29, 1941 and entitled "Translucent Laminated Article" and Borack U.S. Pat. No. 3,309,257 dated Mar. 14, 1967 and entitled "Color Changeable Embossable Laminate" disclosed additional prior art concepts for laminated tapes having color foil instead of a painted substrate while also being suitable for imprintation of similar indicia.

Other imprinting techniques have also been described in the prior art. However, it is believed that the references described above are generally representative of the prior art. Furthermore, techniques such as those described above have been used with tapes comprising a wide variety of plastic resins such as acrylics, allyl diglycol carbonate, cellulose acetate, polycarbonate, polyester, cellulose triacetate, polyestersulfone, polyethylene, polyethylene terephthalate, polyimide, polypropylene, polystyrene, polyvinyl alcohol, polyvinyl acetate, ethylenevinyl acetate, polyethylene oxide, polyvinyl chloride and a number of vinyl copolymers, for example.

Accordingly, there has been found to remain a need for a laminated tape and a method for forming and imprinting the tape in a simplified manner permitting greater versatility in both the design applied to the tape and color combinations possible in the finished tape as well. It is also thus apparent that simplicity both in the tape and the method for forming and imprinting it is also desirable.

SUMMARY OF THE INVENTION

It is therefore an object of the invention to provide a laminated tape and method for forming and imprinting the tape in order to overcome one or more problems such as those described above while also realizing one or more advantages of the type set forth above.

More particularly, it is an object of the invention to provide a tape and method for forming and imprinting the tape wherein the tape comprises an opaque film formed from polytetrafluoroethylene. The use of this material has been found to be essential within the present invention because of the novel characteristic of the material for responding to the application of compressive force by conversion of the compressed portion of the film to a transparent condition. It has been unexpectedly found by the present invention that the use of an opaque film or tape formed from a fluorocarbon polymer and more particularly from polytetrafluoroethylene makes it possible through the application of compressive force to a selected portion of the film or tape to convert the compressed portion of the opaque film to a transparent condition for preferably exposing an underlying contrasting color. Multiple embodiments of such a tape are described below having different means for providing a contrasting color to be exposed in the tape. The contrasting color is formed either by an underlying portion or layer of the tape or by a surface to which the tape is applied.

Even more particularly, the polytetrafluoroethylene tape or film of the present invention is selected to have a thickness generally in the range of from about 1 to 5 mils (that is from about 0.025 to about 0.127 millimeters). According to the method of the present invention, this tape is substantially compressed in selected surface portions, preferably to about one-half of its original thickness in order to make the film or tape transparent. Even more preferably, a tape having a thickness of about 2 to 3 mils (that is, from about 0.051 to about 0.076 millimeters) is employed and compressed to generally the same degree noted above.

It has further been noted in connection with the present invention that a film of the type described above experiences a change from an opaque condition to a translucent condition during initial compression and then to a transparent condition when the material is fully compressed to about one-half of its original thickness. Thus, the invention also suggests the possibility of varying compressive force applied to the tape in order to take advantage of designs combining both translucent and transparent surface portions in the tape, which results in the creation of half tones.

The method and tape of the present invention are further characterized in that the polytetrafluoroethylene tape does not exhibit any lateral displacement of material when compressed in the manner described above. Rather, the material is densified upon compression. More importantly, the polytetrafluoroethylene film of the present invention has been found to exhibit substantially no memory. Thus, the material does not show any tendency to expand afer being compressed and the film readily retains the desired transparent characteristic to form a sharply defined design where compressed.

In addition to advantages either described or made apparent above, the film of the present invention has been found capable of the formation of very well defined or legible letters, numbers or other designs with a sharp contrast between the compressed and uncompressed portions of the film or tape. In particular, the tape does not tend to experience gradual transition of color if it is uniformly compressed. Designs formed in the tape are also permanent with the tape being pliable to the extent that can be formed with a very small radius of curvature. At the same time, the film is waterproof and heat resistant and does not tend to become brittle upon aging. Finally, designs can be formed with relatively limited pressure as is described in greater detail below, thus enabling the tape to be formed into selected designs with a relatively light pressure, with a hand fixture or the like.

None of the prior art films as listed above shows a similar characteristic of becoming transparent upon the application of pressure in the manner disclosed by the present invention.

A number of variations are contemplated for a laminated imprintable tape of the type referred to above. For example, the tape is preferably provided with an adhesive surface covered by a removable or peelable backing for securing the tape or a portion of the tape to a selected surface. The laminated tape also preferably includes a clear protective film formed from acetate or polyester, for example, to protect the opaque film from abrasion or incidental application of compressive force which might accidentally cause a portion of the opague film in the tape to be converted to a transparent condition. It is also noted that the polytetrafluoroethylene film itself is generally impervious to a wide range of temperatures. Accordingly, it is also contemplated that other components of the tape be similarly temperature resistant so that the tape may be used in high temperature environments.

Another method and apparatus for imprinting laminated tapes as well as another tape configuration for use with that method and apparatus to fill the same need as described above was disclosed by the inventor of the present invention in U.S. Pat. No. 4,377,050 issued Mar. 22, 1983. However, the tape configuration of that reference included as an essential component an extrudible color layer sensitive to application of heat and pressure for causing lateral extrusion of the color layer in order to expose a base of contrasting color for forming indicia upon the tape.

By contrast to that prior reference, the present invention as noted above exhibits no lateral extrusion or movement of material. Thus, the present invention permits formation of very well defined indicia or designs. The absence of lateral movement prevents formation of selected indicia or design from interfering with adjacent portions of the tape configuration.

Additional objects and advantages of the invention are made apparent in the following description having reference to the accompanying drawings.

BRIEF DESCRIPTION OF THE DRAWINGS

FIG. 1 is a view in cross-section of one embodiment of a laminated tape formed in accordance with the present invention, the laminated tape being illustrated with a selected surface portion thereof arranged between a die and a platen for imprinting desired indicia or designs upon the tape in accordance with a method of the invention.

FIG. 2 is a view similar to FIG. 1 while illustrating a die being urged toward a platen in order to compress a selected portion of the tape in the manner contemplated by the present invention.

FIG. 3 is a view in cross section of an additional embodiment of a laminated tape constructed in accordance with the present invention.

FIG. 4 is a plan view of the laminated tape of FIG. 1 following the imprinting of indicia or a design thereupon by movement of the die toward the platen as illustrated in FIG. 2.

FIG. 5 is another view in cross-section of yet another embodiment of a laminated tape constructed according to the present invention and adapted for use with the method of the invention.

DESCRIPTION OF THE PREFERRED EMBODIMENTS

Referring now to the drawings, there are disclosed a number of embodiments of laminated tape, each constructed in accordance with the present invention. Each of these tape embodiments includes as an essential element an opague film formed from polytetrafluoroethylene. The invention is based upon the unexpected discovery that such material responds to the application of compressive force by conversion to a transparent condition. Furthermore, compressive force can be applied in widely varying designs and dimensions in order to permit the formation of widely varying indicia or designs upon the tape.

A tape of the material referred to above is available from the Dupont Company under the trademark TEFLON. More particularly, an opaque film of the type required by the present invention is also available in the form of a tape from Garlock, Inc., Newtown, Pa., under the name Thread Seal Tape. This particular tape, which has a thickness in the range of about one to two mils and is opaque or off-white in color, has been found to be particularly effective in its response to the application of compressive force for conversion to a generally transparent condition, as discussed in further detail below in connection with the present invention. This material also exhibits a desirable degree of flexibility for forming the laminated tape and imprinting indicia thereupon in accordance with the present invention. The above tape is also elastic in that it can be stretched along one dimension.

Referring now to FIG. 1, one embodiment of the tape is generally indicated at 10 with a selected surface portion 12 of the tape being arranged between die 14 and platen 16. As is described in greater detail below, the die 14 and platen 16 are urged toward each other as illustrated in FIG. 2 in order to apply compressive force to the selected surface 12 of the film for forming a corresponding indicia upon the film as indicated, for example, at 18 in FIG. 4, which indicia is on the die 14.

In the embodiment of FIG. 1, the laminated tape 10 arranged between the die 14 and platen 16 includes an opaque layer of polytetrafluoroethylene as indicated at 20. That opague film is approximately 3 mils thick. A colored film 22 is secured or cemented to the bottom surface of the opaque film 20 providing a contrasting color, and to said film is applied an adhesive layer or pressure sensitive cement 24 with a peelable backing. Removable backing 26 is applied to the adhesive 24 in order to protect it until the backing 26 is removed for attaching the tape 10 to an exposed surface by the adhesive 24. A protective film 28 is arranged over the top surface of the opaque film 20 in order to provide protection for it against scratching or the like.

When pressure is applied to the surface porton 12 of the tape between the die 14 and platen 16, the tape is subjected to a squeezing or compression effect, causing the resilient polytetrafluoroethylene film to be reduced in thickness as indicated at 21 in FIG. 2. This reduced thickness in the polytetrafluoroethylene film, as will be described in greater detail below, results in the development of a transparent condition in accordance with the present invention.

When the tape is removed from between the die and platen, the compressed portion 21 remains in that condition with all other areas of the tape being uneffected in order to develop a definite and precise color contrast between the portion 12 of the tape and other uncompressed portions of the tape including colored film 22.

The amount of pressure required for changing the polytetrafluoroethylene tape to a transparent condition ranges from about 1,000 to 10,000 pounds psi depending upon film thickness. For example, about 4,700 pounds psi pressure has been found to be particularly suitable for tape including a layer of about 0.0025 inches (about 0.064 millimeters) of opaque polytetrafluoroethylene film and about 6,500 pounds psi for a tape including an opaque layer of polytetrafluoroethylene film about 0.0035 inches thick (or about 0.089 millimeters).

From a practical standpoint, the present invention makes it possible to produce labels, for example, having letters or numbers or other indicia which are about 5/32nd inches in height by about ⅛ inches in width with a 0.020 inch stroke using a hand-held press (not shown) with a force of only about 5 pounds being required on the lever arm (also not shown) of the press. Such a hand-held press is, of course, not a portion of the present invention and is set forth herein only to better illustrate certain advantages of the invention.

Since there is essentially no lateral movement of material in the polytetrafluoroethylene upon compression as noted above, there is no limit as to how close indentations or impressions in the tape can be formed without material being forced laterally to interfere with an adjacent indentation.

Exposure tests with tape having indicia formed thereon in accordance with the present invention under different conditions of heat, cold, sunshine and water have revealed no tendency of excessive weathering. In particular, such tests have not indicated any tendency of compressed areas to return to their original opaque condition.

Furthermore, since the polytetrafluoroethylene film is stable between the temperatures of about −450° F. to about 500° F., a tape or other composite structures can be made using high melting films such as nylon, for example, and also suitable high temperature adhesives in order to form labels which can be used on hot surfaces such as boilers or hot steam pipes.

The unexpected and unique printing characteristics disclosed by the present invention are believed possible particularly with the use of a special form of polytetrafluoroethylene shown available, for example, under the trade name TEFLON from the Dupont Company, under the trade name HALON from Allied Chemical Company and under the trade name FLUON from I.C.I. Americas Inc. Unlike the form of polytetrafluoroethylene used to coat cookware or the rigid type of material employed, for example, in molded parts, the film or tape used in this invention is preferably made by specially preparing the polytetrafluoroethylene and then extruding it to form a thin film. The extrudate is preferably made in various thicknesses and can be used in accordance with the present invention in thicknesses ranging, for example, from 1 to 5 mils as noted above. Preferably, the thickness of the film is maintained in the range of about 2½ to 3½ mils as was also noted above.

This film is opaque or chalky white in color and has the feel and flexibility of silk. It has a density of about 1 to 1.5 grams per cubic centimeter and is understood to be formed with microscopically fine strands of polytetrafluoroethylene running longitudinally through the film. The relating loose alignment of these strands are believed to be the reason for the ductility of the film.

As noted above, the unexpected and surprising feature of the present invention is the ability of such film to be compressed to about one-half of its thickness, for example, and to thereupon become transparent.

As noted above, such a tape is currently available on the market for an entirely different use (as a thread sealant in pipes and fittings).

The invention also contemplates, in the embodiments of FIGS. 1–4, the provision of an underlayment for the opaque film 20 to provide a contrasting color for exposure through those transparent portions of the opaque film produced by compression, for example, between the die 14 and platen 16 in FIG. 1 to produce compressive forces in the pressure ranges set forth above.

However, it is also to be noted that compressive forces could also be applied to the tape or film by other means than the die 14 and platen 16. For example, the invention also contemplates the application of compressive force by vibrating means (not shown), other impact means (not shown) as well as a variety of other compression techniques which are believed to be clearly suggested by the present invention. For example, impact means which could be used in accordance with the present invention for applying compressive force could include the printing elements of a conventional typewriter or the like (not shown).

Once compressive force has been applied to the tape within the selected surface area 12 of FIG. 1 to produce compression of the polytetrafluoroethylene tape as indicated at 21 in FIG. 2, an indicia or design as indicated, for example, at 18 in FIG. 4 is formed upon the tape.

Another embodiment of laminated tape constructed in accordance with the present invention is illustrated in FIG. 3 and includes the same combination of an opaque film formed from polytetrafluoroethylene as indicated at 20' and a clear protective film laminated above the opaque film as indicated at 28'.

The contrasting color for the tape 10' of FIG. 3 is formed by a colored adhesive material 30 applied either to the surface of the opaque film 20' or to the surface of a clear film 32. With the clear film 32 being laminated to the opaque film 20', the tape 10' increases in stiffness and the colored adhesive 30 is positioned to provide a contrasting color beneath the opaque film 20' for exposure when any portion of the opaque film is converted to a transparent condition by the application of compressive force in accordance with the present invention.

As with the embodiment of FIG. 1, adhesive material 24' and a removable backing 26' are provided on the base of the tape for securing it to any selected surface.

Yet another embodiment of laminated tape constructed according to this invention is illustrated in FIG. 5 and includes the same combination of an opaque film formed from polytetrafluoroethylene as indicated at 20' and a clear protective film 28'. Adhesive material 24' and a removable backing 26' are also provided on the base of the tape, the backing 26' being removable for securing the tape to a selected surface by means of the adhesive material 24'.

Within the embodiment of FIG. 5, it is important to note that the tape does not include an opaque layer or film to provide a contrasting color beneath the opaque film 20' as in the embodiments of FIGS. 1–4. The adhesive material 24' is particularly contemplated as being generally transparent. Thus, the contrasting color for the tape of FIG. 5 is provided by the surface to which the tape is applied. The colors of the tape and the surface to which the tape is applied may be selected with suitable contrast, if desired.

It should also be understood that the adhesive material 24' could be any desired color instead of being generally transparent. In this embodiment, the contrasting color is thus supplied by the adhesive material 24' instead of the surface to which the tape is applied.

A further embodiment would allow the opaque film 20' to have on the bottom surface thereof a colored ink coating to provide the contrasting color.

Accordingly, there has been described above a laminated tape and a method for forming the tape and imprinting it with selected indicia of widely varying design and dimensions. Numerous modifications and variations are believed apparent from the description. Accordingly, the scope of the invention is defined only by the following appended claims.

What is claimed is:

1. A tape adapted for imprinting of indicia upon selected surface portions thereof, comprising an opaque film formed from polytetrafluoroethylene and having a top surface and a bottom surface, a layer of material being laminated to the bottom surface of said opaque film, said layer having a contrasting color underlying the opaque film in the selected surface portions of the tape whereby, upon application of compression force to the selected surface portions of the laminated tape, corresponding portions of said opaque film are compressed without any lateral displacement and thereby converted to a transparent condition in order to expose the underlying contrasting color of said laminated layer and thereby form the imprinted indicia.

2. The laminated tape of claim 1 wherein the opaque film is relatively light in color and the laminated layer is relatively dark in color.

3. The laminated tape of claim 1 further comprising an adhesive surface and a removable backing over the adhesive surface to facilitate application of the tape to a selected surface.

4. The laminated tape of claim 1 wherein said laminated tape includes an adhesive surface opposite said opaque film and further comprising a peelable backing for selectively exposing the adhesive surface of said laminated layer.

5. The laminated tape of claim 1 wherein the laminated layer comprises a clear film and a colored adhesive opposite the opaque film and further comprising a peelable backing over the colored adhesive to facilitate application of the tape to a selected surface.

6. The laminated tape of claim 1 wherein said laminated layer is formed from a film of said contrasting color.

7. The laminated tape of claim 1 further comprising a clear film laminated to the opaque film opposite the laminated layer to serve as a protective layer for the opaque film.

8. The laminated tape of claim 1 wherein the imprintable tape is adapted for arrangement between a die and a platen for applying compressive pressure to its selected surface portions.

9. The laminated tape of claim 1 wherein the imprintable tape is adapted for compression to reduce the thickness of the polytetrafluoroethylene film by about one-half in order to produce said transparent condition.

10. The laminated tape of claim 1 wherein all components of the tape are formed from temperature resistant materials in order to adapt the tape for use in high temperature environments.

11. The laminated tape of claim 1 wherein said opaque film of polytetrafluoroethylene has a thickness in the range of from about 1 to 5 mils.

12. The laminated tape of claim 11 wherein said opaque film of polytetrafluoroethylene has a thickness in the range of about 2½ to 3½ mils.

13. The laminated tape of claim 1 wherein a colored ink coating is applied to the bottom surface of said opaque film.

14. The laminated tape of claim 13 further comprising a film laminated to the opaque film adjacent to the colored ink coating in order to provide protection for the coloring agent.

15. A tape adapted for imprinting of indicia upon selected surface portions thereof, comprising an opaque film formed from polytetrafluoroethylene and having a top surface and a bottom surface, a layer of adhesive material being laminated to the bottom surface of said opaque film and a removable backing over the adhesive material to facilitate application of the tape to a selected surface whereby, upon application of compression force to predetermined surface portions of the laminated tape, corresponding portions of said opaque film are converted to a transparent condition without any lateral displacement in order to expose the selected surface to which the tape is applied and thereby form the imprinted indicia.

16. The laminated tape of claim 15 further comprising a clear film laminated to the top surface of the opaque film to serve as a protective layer.

17. The laminated tape of claim 15 having indicia pressed upon the selected surface portions thereof.

18. The laminated tape of claim 15 wherein all portions of the laminated tape are formed from temperature resistant materials in order to adapt the tape for use in high temperature environments.

19. The laminated tape of claim 15 being adapted for compression to reduce said opague film of polytetrafluoroethylene to about one-half of its original thickness in order to cause it to become transparent in said selected surface portions of said tape.

20. The laminated tape of claim 15 wherein said opaque film of polytetrafluoroethylene has a thickness in the range of about 1 to 5 mils.

21. The laminated tape of claim 20 wherein said opaque film of polytetrafluoroethylene has a thickness in the range of about 2½ to about 3½ mils.

* * * * *